United States Patent [19]

Den Boer et al.

[11] Patent Number: 4,693,751

[45] Date of Patent: Sep. 15, 1987

[54] TITANIUM DIOXIDE SUSPENSION FOR USE IN FILM COATING

[75] Inventors: Patrick Den Boer, Glen Rock; Richard F. Heinze, Bridgewater, both of N.J.

[73] Assignee: Crompton & Knowles Corporation, New York, N.Y.

[21] Appl. No.: 827,655

[22] Filed: Feb. 7, 1986

Related U.S. Application Data

[63] Continuation of Ser. No. 643,550, Aug. 23, 1984, abandoned.

[51] Int. Cl.[4] .............................................. C08L 5/00
[52] U.S. Cl. ................................................... 106/209
[58] Field of Search .......................... 106/300, 209, 28

[56] References Cited

U.S. PATENT DOCUMENTS

| | | | |
|---|---|---|---|
| 3,364,040 | 1/1968 | Criss | 106/38.35 |
| 3,428,464 | 2/1969 | Pollard | 106/38.35 |
| 3,455,705 | 7/1969 | Rusher | 106/38.23 |
| 3,663,284 | 5/1972 | Stancioff et al. | 106/300 |
| 3,821,008 | 6/1974 | Jordan et al. | 106/38.23 |
| 3,981,984 | 9/1976 | Signorino | 106/193 J |
| 4,155,314 | 5/1979 | Callaghan | 106/208 |
| 4,238,510 | 12/1980 | Cherukuri | 426/658 |
| 4,363,669 | 12/1982 | Cottrell | 106/208 |

*Primary Examiner*—Theodore Morris

[57] ABSTRACT

The invention is directed to a pigment suspension, for use in film coating, comprising titanium dioxide, xanthan gum, and an aqueous solvent. It was found that a pigment suspension comprising 30 percent titanium dioxide was obtainable that did not settle or harden for an extended period of time.

1 Claim, No Drawings

TITANIUM DIOXIDE SUSPENSION FOR USE IN FILM COATING

This is a continuation of co-pending application Ser. No. 643,550 filed on Aug. 23, 1984, now abandoned.

THE BACKGROUND OF THE INVENTION

The pigment suspension of the present invention is used for producing a film coating of such items as pharmaceutical tablets, confectionary pieces, and the like. The pigment suspension is typically stirred into a larger volume of polymer solution. The resulting film-forming suspension is used in the coating process. The film coating, in the form of a very thin film, must be uniform and consistent from one batch of tablets to the next.

The technique of film coating is generally known in the prior art. U.S. Pat. No. 2,954,323 to Endicott et al. discloses the increased efficiency and superior coating properties obtained with film coating in general as compared to other processes of coating.

The present invention relates to a pigment suspension which comprises, as pigment, titanium dioxide. Such pigment suspensions for use in film coating are preferably sold having a concentration of titanium dioxide as high as possible. However, as the concentration of titanium dioxide increases, the suspension tends to become more viscous and may reach a point where it becomes difficult to pour from its container. Upon aging, a thick suspension of titanium dioxide may harden to the extent of becoming unusable.

In developing a high concentration pigment suspension, it is desirable to obtain a product in which the titanium dioxide particles form a stable suspension and will not settle for a prolonged period of time. The need is for a pigment suspension which will readily pour from its container and will maintain its uniform properties, during both transportation and storage, until ready for application in film coating.

U.S. Pat. No. 3,981,984 to Signorino discloses a pigment suspension which claims to achieve a high concentration of titanium dioxides in a non-aqueous solvent. This pigment suspension consists of titanium dioxide particles, a protective colloid such as hydroxypropyl cellulose, and a non-aqueous solvent such as ethanol. Signorino teaches that as the titanium dioxide particles are added to the solvent, the mixture becomes too viscous, and the further addition of the protective colloid serves to suspend the particles and reduce the viscosity.

In view of the increasingly strict requirements of governmental regulating agencies in regard to the use of organic solvents, it has become desirable to obtain aqueous pigment suspensions. However, a high content of titanium dioxide in water is not normally possible for use in film-coating. Although titanium dioxide suspensions in an aqueous sugar syrup are known, such suspensions are not generally suitable for use in a film-forming polymer solution.

The present invention involved a search for a combination of ingredients which would permit a high content of titanium dioxide particles in an aqueous suspension useful in film coating. Due to the fact that the composition may comprise merely water and a very small amount of xanthan gum, not requiring the presence of organic solvents, the composition is very simple, safe and inexpensive to make.

THE OBJECTS OF THE INVENTION

One object of the present invention is to achieve a pigment suspension which contains a high titanium dioxide content.

Another object of the present invention is to achieve a high concentration pigment suspension in a solvent comprising a substantial amount of water, for use in film coating.

A further object of the invention is to obtain a high concentration pigment suspension which pours readily from containers.

A further object of the invention is to obtain a high concentration pigment suspension which does not settle upon aging.

A further object of the present invention is to obtain a pigment suspension with a high titanium dioxide concentration which is capable of being transported to customers in containers, and which may readily be combined with a film-forming polymer solution by stirring.

A further object of the present invention is to produce an aqueous pigment dispension which is inflammable and non-hazardous during handling and safe for use in edible products intended for human consumption.

The above and other objects of the present invention will become apparent from a reading of the following detailed description of the invention and the preferred embodiments thereof.

DETAILED DESCRIPTION OF THE INVENTION

The pigment suspension of the present invention comprises a mixture of titanium dioxide, xanthan gum, and water.

The titanium dioxide pigment employed in the present invention is preferably water dispersable titanium dioxide 3328, sold by Whitaker, Clarke and Daniels in South Plainfield, N.J. The pigment is suitable present in an amount by weight of about 20 to 75 percent, and most preferably in an amount by weight of about 30 to 60 percent.

Titanium dioxide is a relatively heavy pigment which, when mixed in a solvent, tends to settle out and form a thick non-pourable layer of pigment on the bottom of the container. It has now been found that an excellent aqueous pigment dispersion can be obtained by the addition of a very small amount of xanthan gum.

Xanthan gum is a high molecular weight polysaccharide produced in a fermentation process by the microorganism *Xanthomonas campestris*. The gum, which is produced as an exocellular coating surrounding the cell wall of the microorganism, is unique and very specific, and the properties thereof are constant and reproducable under given conditions.

Xanthan gum is known as a suspending or dispersing agent in various applications. For example, xanthan gum has been used to suspend solids in ceramic glazes, paints, and textile print pastes.

The use of xanthan gum to create a high concentration titanium dioxide pigment suspension for use in a film-forming process in the food and drug industry is believed to be entirely new.

A commercially available xanthan gum, suitable in the present invention, is KELTROL, and especially Keltrol F, a finely meshed xanthan gum, manufactured by Kelco, a division of Merk and Co., Incorporated.

The suspension of the present invention differs from other suspensions in that it can exhibit gel like behavior or very fluid behavior. Typically, the suspension actually sets up and only breaks down into a liquid by shearing action, such as produced by merely shaking the container of the pigment suspension, resulting in a readily pourable pigment suspension.

The xanthan gum is present in the invention in amounts, by weight, ranging from 0.005 to 5.0 percent. As is evident, typically only relatively very small quantities of the xanthan gum need be present in the suspension. A preferred range is 0.05 to 0.50 percent.

Compositions of the present invention were tested by what is referred to as an oven test. An oven test is an accelerated method of assessing the long-term properties of a pigment suspension. The oven test typically involved heating the pigment suspension at 104° F. for a period, initially, of 96 hours. This accelerated test is believed to be equivalent to 3 to 4 months at 85° F. Compositions of the present invention have withstood heating at 104° F. for one month. The oven test results were evaluated according to the following rating system.

RATING SYSTEM 1.0: A rock hard or very hard settle is obtained. The suspension fails to redisperse.

2.0: A paste or semi-hard solid is obtained. The suspension fails to pour from its container without force or requires the use of a spatula.

3.0: A threshold suspension, with some supernatant, but stable. After agitation, the suspension is still thick, but pourable.

4.0: A suspension with or without supernatant but no settle is obtained. The consistency is like thick yogurt. On agitation the suspension becomes fluid.

5.0: A soft, fluid dispersion with no settle is obtained. It pours from its container with no agitation and flows freely.

5.5: The suspension has no settle, but is very watery.

6.0: The suspension is too watery, and is not acceptable.

EXAMPLE 1

In a blender, the following components were weighed out and mixed:

| Component | Percent by Weight |
| --- | --- |
| Water | 69.80% |
| Xanthan Gum | 0.20% |

-continued

| Component | Percent by Weight |
| --- | --- |
| $TiO_2$ | 30.00% |

The xanthan gum was added to the water while mixing at a moderate speed. Mixing was maintained for about 3 minutes or until all of the gum had dissolved. The titanium dioxide was added slowly while the blender was mixing. The speed was adjusted to maintain a vortex in the mixture.

An oven test was performed at 104° F. for 96 hours. A rating of 5.5 was obtained. After a further period of 21 days at 104° F., a rating of 5.5 was obtained, indicating that the properties of the pigment suspension remained stable.

Xanthan gum has unique properties which permit the creation of a stable and pourable titanium dioxide pigment suspension. Other gums or colloids, natural and synthetic, do not produce a satisfactory product. The following table illustrates other gums which were tried, but found unacceptable.

TABLE A

| Component | Percent Weight | | |
| --- | --- | --- | --- |
| | Trial/1 | 2 | 3 |
| Distilled water | 49.80 | 49.80 | 49.80 |
| Titanium dioxide | 50.00 | 50.00 | 50.00 |
| Guar gum | 0.20 | | |
| Polyvinylpyrrolidone | | 0.20 | |
| KLUCEL | | | 0.20 |
| Rating | 1.0 | 1.0 | 1.0 |

As shown in Table A, guar gum, polyvinylpyrrolidone, and KLUCEL, a brand of hydroxypropyl cellulose manufactured by Hercules Co. in Wilmington, Del., were unacceptable, resulting in a suspension that was immediately unusable. Gum arabic was satisfactory only at high levels such as 15 percent, too high for commercial practicability.

Conventional additives may be included in the present composition, as will be understood by those skilled in the art. For example, about 0.1 percent of an antimicrobial agent such as methylpropyl paraben or potassium sorbate is suitable.

It is to be understood that the foregoing detailed description and preferred embodiment are merely given by way of illustration, and modifications may be made, within the skill of the art, without departing from the scope and spirit of the invention.

We claim:

1. A composition for an aqueous pigment suspension useful in film coating, consisting essentially by weight of 50 percent titanium dioxide pigment, about 0.005 to 5 percent xanthan gum, and about 50 percent water.

* * * * *

UNITED STATES PATENT AND TRADEMARK OFFICE
CERTIFICATE OF CORRECTION

PATENT NO. : 4,693,751

DATED : September 15, 1987

INVENTOR(S) : Patrick Den Boer, et al

It is certified that error appears in the above-identified patent and that said Letters Patent is hereby corrected as shown below:

Title page, Abstract, line 4, "comprising 30 percent titanium dioxide" should read --comprising 50 percent titanium dioxide--.

Signed and Sealed this

Thirty-first Day of May, 1988

Attest:

DONALD J. QUIGG

Attesting Officer

Commissioner of Patents and Trademarks